United States Patent
Rosin et al.

(10) Patent No.: US 9,301,168 B2
(45) Date of Patent: Mar. 29, 2016

(54) METHOD FOR MANAGING A DEGRADED MODE OF A CELL IN A RADIOCOMMUNICATION NETWORK

(75) Inventors: Frédéric Rosin, Montesson (FR); Alain Janssoone, Saint Lambert Des Bols (FR); Lannig Tanneau, Ottawa (CA)

(73) Assignee: CASSIDIAN SAS, Elancourt (FR)

( * ) Notice: Subject to any disclaimer, the term of this patent is extended or adjusted under 35 U.S.C. 154(b) by 105 days.

(21) Appl. No.: 13/813,992

(22) PCT Filed: Aug. 2, 2011

(86) PCT No.: PCT/EP2011/063309
§ 371 (c)(1),
(2), (4) Date: Apr. 3, 2013

(87) PCT Pub. No.: WO2012/016988
PCT Pub. Date: Feb. 9, 2012

(65) Prior Publication Data
US 2013/0201818 A1 Aug. 8, 2013

(30) Foreign Application Priority Data

Aug. 4, 2010 (FR) ..................................... 10 56448

(51) Int. Cl.
*H04W 24/04* (2009.01)
*H04W 72/00* (2009.01)

(52) U.S. Cl.
CPC ............ *H04W 24/04* (2013.01); *H04W 72/005* (2013.01)

(58) Field of Classification Search
None
See application file for complete search history.

(56) References Cited

U.S. PATENT DOCUMENTS

| | | | | |
|---|---|---|---|---|
| 6,683,848 B1 * | 1/2004 | Parrish | ................. | H04J 3/0688 370/218 |
| 8,856,580 B2 * | 10/2014 | Mongeau | ................ | H04L 69/40 714/2 |
| 2003/0017836 A1 * | 1/2003 | Vishwanathan et al. | ....... | 455/517 |
| 2007/0225028 A1 * | 9/2007 | Nelson et al. | ................. | 455/524 |
| 2008/0056121 A1 * | 3/2008 | Tsai et al. | ..................... | 370/216 |
| 2008/0240072 A1 * | 10/2008 | Bykovnikov | ................. | 370/350 |
| 2011/0038284 A1 * | 2/2011 | Senarath et al. | .............. | 370/279 |

FOREIGN PATENT DOCUMENTS

| | | |
|---|---|---|
| EP | 1 198 147 A2 | 4/2002 |
| EP | 1198147 * | 4/2002 |
| WO | WO 00/14986 | 3/2000 |

OTHER PUBLICATIONS

International Search Report as issued for PCT/EP2011/063309.

* cited by examiner

*Primary Examiner* — Steve Young
(74) *Attorney, Agent, or Firm* — Pillsbury Winthrop Shaw Pittman LLP

(57) ABSTRACT

A method for managing a degraded mode of a cell of a cellular network including a site controller for controlling, via a packet network, transmitters distributed over various sites of the cell such that transmitters implementing the same pair of frequencies over different sites form a channel which, in dynamic mode, is allocated dynamically to any communication between terminals of the cell, the channel including a master transmitter selected by the controller. The method includes, in each master transmitter on detection of a failure of the controller: switching in degraded mode of the master transmitter, by associating with the channel a predefined communication known to the terminals, and transmission from the master transmitter, via the network, of a control message informing a control console connected to the packet network of the implementation of the degraded mode so that the console participates in a communication underway in the channel.

12 Claims, 1 Drawing Sheet

Single figure

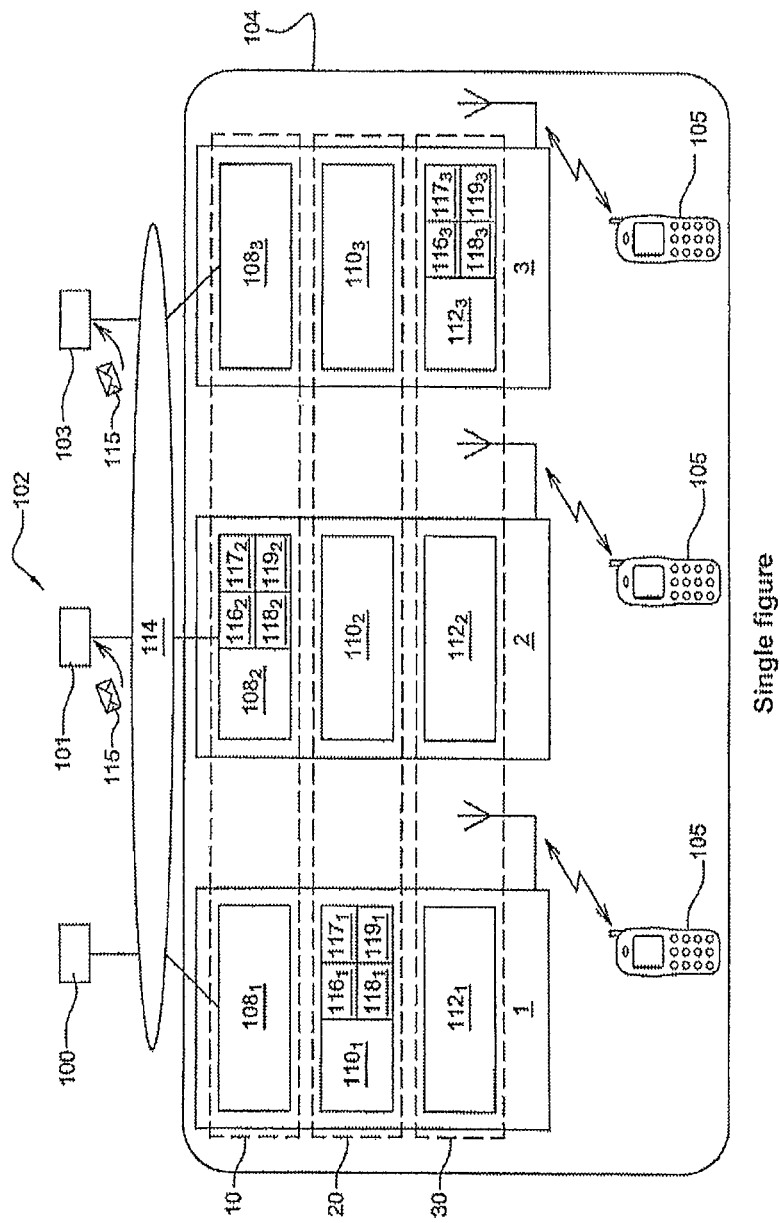
Single figure

METHOD FOR MANAGING A DEGRADED MODE OF A CELL IN A RADIOCOMMUNICATION NETWORK

CROSS-REFERENCE TO RELATED APPLICATIONS

This is the U.S. National Stage of PCT/EP2011/063309, filed Aug. 2, 2011, which in turn claims priority to French Patent Application No. 1056448, filed Aug. 4, 2010, the entire contents of all applications are incorporated herein by reference in their entireties.

The present invention relates to a method for managing a degraded mode of a cell in a radio communication network, the method being implemented in a communication system.

Utilizing a controller, also called a "base station controller," in a radio communication network to control sites that notably comprise at least one transmit-receive transmitter and an antenna is known.

The role of such a site is to transmit and receive communications relative to terminals located in an associated zone or cell.

In addition, transmitters present on different sites may transmit communications between terminals of the cell over a same frequency band in transmission and reception so as to form a dynamically allocated, or trunked, transmission channel.

Connecting, to transmitters of a site located near the site controller, a local control console enabling a third party to communicate, via this local control console, with terminals communicating via the transmission channels, is also known. The local control console may initiate a group communication or may be prompted to enter in a group communication. It is thus suitable for operation in a PMR (Private Mobile Radio Communication) network.

Typically, such a console is operated by a professional, such as a security agent or a network maintenance agent, who may thus quickly and reliably enter in contact, via a transmitter, with said terminals.

In addition, putting the transmitters of a site in degraded or fail soft mode when the site controller is failing is known. Such a degraded mode maintains the transmission channel allocations, that have already been carried out so that communications in progress may continue.

In addition, in such a degraded mode, groups of terminals associated with the same channel are formed such that communication between these associated terminals is always possible.

However, during such a failure disrupting communications between the site controller and the site transmitters and leading to the establishment of a degraded mode of the cell, only a control console directly connected to the transmitter may establish communication with terminals communicating via the transmitter.

Such being the case, it may be of interest, or even necessary, that a remote console, typically in a monitoring centre, may be informed of the implementation of the degraded mode of a cell to, possibly, establish communications with the terminals of this cell, said remote control console performing the same functionalities as a local control console, in particular initiating group communication or being prompted to enter in a group communication.

For this purpose, the invention proposes a method for managing a degraded mode of a cell of a cellular telecommunication network, said network comprising a site controller intended to control, via a packet network, a plurality of transmitters distributed over different sites of the cell such that the transmitters implementing the same pair of frequencies over different sites form a channel, that in dynamic mode is dynamically allocated to any communication between terminals of the cell, said channel comprising a master transmitter selected by the site controller, characterized in that the method comprises, in each master transmitter on detection of a failure of the site controller, the following steps:

switching in degraded mode of the master transmitter by associating with the channel a predefined communication known to the terminals, and transmission from the master transmitter, via the packet network, of a control message informing at least one control console connected to the packet network of the implementation of the degraded mode such that the console participates, via said packet network, in a communication in progress in the channel.

Thanks to the invention, a control console may be informed of a failure of the site controller and of the establishment of a degraded mode by the cell transmitters even though the console is not directly connected to the transmitters.

In fact, the indication of the establishment of the degraded mode is done via a packet network that also enables the control console to participate in communications activated in this degraded mode.

The method according to the invention may also present one or more of the characteristics below, considered individually or according to all technically possible combinations:

the control message is periodically transmitted to a multicast control address of the packet network;

the control message comprises an indicator of the status of the predefined communication in the associated channel, indicating:

an active status when the predefined communication is established by a terminal on the associated channel, the master transmitter also being considered to be in the active status, and a passive status when no predefined communication is established by a terminal on the associated channel, the master transmitter also being considered to be in the passive status;

the control message transmitted by the master transmitter comprises at least one of the following pieces of information: an identifier of the master transmitter, an identifier of the associated channel, a predefined pair of frequencies associated with the channel, a multicast traffic address;

the method according to the invention comprises, in the master transmitter, the steps of:

transmitting IP packets of digitized speech data from a terminal to the multicast address of traffic brought by the control message, and receiving IP packets of digitized speech data via the multicast traffic address, the IP packets coming from a control console such that they are transmitted by the master transmitter to the terminals;

the method according to the invention comprises, in each master transmitter when the site controller is no longer failing:

detection of the proper operation of the site controller, switching of the master transmitter of the associated channel to dynamic mode, and transmitting the control message informing at least one control console connected to the packet network of the end of the degraded mode.

Another object of the present invention is a communication system comprising a cell of a cellular telecommunication network, said network comprising a site controller intended to control, via a packet network, a plurality of is transmitters distributed over different sites of the cell such that the transmitters implementing the same pair of frequencies over different sites form a channel, that in dynamic mode is dynamically allocated to any communication between terminals of the cell, said channel comprising a master transmitter selected by the site controller, characterized in that it comprises, in each master transmitter during a failure of the site controller:

detection means to detect the failure of the site controller,
 switching means to switch the master transmitter to degraded mode by associating with the channel a predefined communication known to the terminals, and
 transmission means to transmit, via the packet network, a control message informing at least one control console connected to the packet network of the implementation of the degraded mode such that the control console participates, via said packet network, in a communication in progress in the channel.

The system according to the invention may also present one or more of the characteristics below, considered individually or according to all technically possible combinations:

the system according to the invention also comprises transmission and reception means in each master transmitter to:
   transmit IP packets of digitized speech data coming from a terminal to a multicast traffic address to at least one control console and
   receive IP packets of digitized speech data via the multicast traffic address, the IP packets coming from a control console such that they are transmitted by the master transmitter to the terminals.
 when the site controller is no longer failing, the detection means of each master transmitter detect a proper operation of the site controller, the switching means of each master transmitter switch each master transmitter from degraded mode to dynamic mode, and the transmission means of each master transmitter transmit the control message informing at least one control console connected to the packet network of the end of the degraded mode.

Another object of the present invention is a master transmitter of a communication system comprising a cell of a cellular telecommunication network, said network comprising a site controller intended to control, via a packet network, a plurality of transmitters distributed over different sites of the cell such that the transmitters, including the master transmitter, implementing the same pair of frequencies over different sites form a channel, that in dynamic mode is dynamically allocated to any communication between terminals of the cell, characterized in that it comprises, during a failure of the site controller:

detection means to detect the failure of the site controller,
 switching means to switch the master transmitter to degraded mode by associating with the channel a predefined communication known to the terminals, and
 transmission means to transmit, via the packet network, a control message informing at least one control console connected to the packet network of the implementation of the degraded mode such that the control console participates, via said packet network in a communication in progress in the channel.

The master transmitter according to the invention may also present one or more of the characteristics below, considered individually or according to all technically possible combinations:

the master transmitter also comprises transmission and reception means to:
   transmit IP packets of digitized speech data from a terminal to a multicast traffic address to at least one control console and
   receive IP packets of digitized speech data via the multicast traffic address, the IP packets coming from a control console such that they are transmitted by the master transmitter to the terminals;
 when the site controller is no longer failing, the detection means detect a proper operation of the site controller, the switching means switch the transmitters of the associated channel to dynamic mode, and the transmission means transmit the control message informing at least one control console connected to the packet network of the end of the degraded mode.

The invention will be better understood upon reading the following description, given only for illustrative and non-limiting purposes, with reference to the attached drawing in which a schematic view of a network implementing a method in conformance with the invention is represented.

With reference to this FIGURE is represented a communication system comprising a site controller 100, a radio communication network 102, transmitting and receiving radio communications in a cell 104. The controller 100 controls a plurality of sites 1 to I such that each site i, with i between 1 and I, comprises a plurality of transmitters transmitting and receiving over distinct frequency pairs to terminals 105. The transmitters transmitting and receiving over the same frequency pair and respectively belonging to different sites form a radio transmission channel.

It will be noted that a site is also called a base station and a base transceiver station or is abbreviated BTS.

It is noted that the site controller also called a base station controller or abbreviated BSC enables the sites to be controlled.

Typically, a site controller has tens or even hundreds of sites under its control. A site controller manages the allocation of communication channels, controls the roaming of terminals, known as "handovers," from one site to another site and controls the radio frequency level in the sites.

By referring to the attached figure, one takes as an example in the rest of the document the case of a cell comprising 3 sites 1, 2 and 3, each site i being equipped with three transmitters $108_i$, $110_i$ and $112_i$, each establishing a suitable transmission channel, for example, each site establishes three transmission channels 10, 20 and 30. However, the invention applies whatever the number of transmitters and whatever the number of channels. The transmitters $108_1$, $108_2$ and $108_3$, transmit and receive from different respective sites 1, 2 or 3 over a same frequency pair in transmission and in reception thus forming a first transmission channel 10 in cell 104. Similarly, transmitters $110_1$, $110_2$ and $110_3$ transmit over a second channel 20 and transmitters $112_1$, $112_2$ and $112_3$ transmit over a third channel 30 as represented according to the example of the attached figure.

In dynamic mode of the cell, the radio resources are managed dynamically, or as a trunked network. More specifically, site controller 100 dynamically allocates one of the free transmission channels to activate any communication by the terminals of the cell or by a remote entity such as a control console or a device of another cell.

It is noted that a control console carries out the same functionalities as a local control console, i.e.:

enables a third party to communicate, via this remote control console, with terminals communicating via the transmission channels;

initiates a group communication or is prompted to enter in a group communication. It is thus suitable for operation in a PMR (Private Mobile Radio Communication) network.

The method described also applies to cellular networks carrying out PMR (Private Mobile Radiocommunications) type communications.

The site controller 100 selects for each channel 10, 20 and 30 a master transmitter, for example $110_1$, $108_2$ and $112_3$, from among the transmitters transmitting over the same transmission channel. The role of this master transmitter is to synchronize the transmission from all transmitters of the same channel of a message to the terminals of the cell. This synchronization may be carried out, for example, by means of GPS "Global Positioning Signal" satellite signals such that each transmitter receives the message to transmit accompanied by a transmission time to reach to transmit the is message at the same time over the associated transmission channel. It is also possible to provide that the master transmitter communicates temporary references to the other transmitters of the associated transmission channel such as radio transmission times of messages, durations of these messages, in order to synchronize the transmission of messages.

Site controller 100 selects each master transmitter in a predefined or random manner, the selection of one or more master transmitters may change during the operation of the cell.

In dynamic or trunked mode of the cell, the controller 100 selects at least one channel—channel 10 in this example—as the control channel in which the frequency band is particularly implemented to exchange the signalling necessary for establishing terminal 105 communications. The other channels 20 and 30 are dynamically allocated by the controller 100 to communications during their establishment.

In dynamic mode, one or more of the control 101 or remote 103 consoles connected to the IP packet network 114 may participate in communications with terminals 105 via the site controller 100.

During the failure of site controller 100, the dynamic allocation of transmission channels 20 and/or 30 is inhibited and the master transmitters switch to a degraded or fail soft mode, enabling a predefined transmission channel 10, 20 and/or 30 known to terminals 105 to be statically associated with a predefined communication known to terminals 105. In this case, cell 104 is considered to be in degraded mode. In this degraded mode, each master transmitter periodically transmits a control message 115 to a multicast address, known as the control address, from the packet network 114 enabling the control consoles 101, 103 to be informed of the degraded mode of the cell. The multicast control address may be identical for all the control messages 115 transmitted by the master transmitters. In a variation, the multicast control address may be different for the control messages 115 transmitted by different master transmitters.

In the control message 115, each master transmitter also indicates the status of the predefined communication in the associated transmission channel. The control message 115 thus comprises an indicator of the status of the communication in the channel. The indicator indicates an active status when the predefined communication is established by a terminal 105 over the associated channel, the master transmitter in this case is also considered to be in active status. Otherwise, the indicator indicates a passive status for the communication and the master transmitter and no communication is in progress over the associated channel.

In the control message 115, each active master transmitter also indicates the multicast address, called the traffic address, of the packet network 114 enabling the control consoles 101, 103 to participate in the communication in progress in the associated transmission channel. The traffic address is different for each transmission channel associated with each master transmitter in degraded mode. The master transmitter uses the traffic address to transmit IP packets of digitized speech data coming from terminals 105 to control consoles and enables the receipt of IP packets of digitized speech data coming from control consoles to terminals 105.

A method of managing the degraded mode of the cell according to the invention is implemented in means $116i$, $117i$ and $118i$, situated in each of the master transmitters. The method comprises the following steps:

detection by detection means $116i$ of the failure of site controller 100 that no longer communicates with the master transmitter, switching by switching means $117i$ of transmitters to degraded mode by associating in a predefined manner known to terminals 105 a communication with each channel of the cell, and transmission from the transmission means $118i$ to a multicast control address of the IP packet network 114 and to one or more control consoles 101 and 103 of the control message 115 informing the consoles of, among other information, the implementation of the degraded mode.

Each master transmitter also comprises means $119i$ for transmitting and receiving IP speech packets to or from the multicast traffic address. Means $119i$ receive IP packets of digitized speech data coming from terminals 105 participating in the predefined communication and transmit them to the multicast traffic address to control consoles 101, 103 connected to the IP packet network 114. In addition, means $119i$ of the master transmitter receive, via the multicast traffic address, IP packets of digitized speech data coming from at least one control console 101, 103 and transmit them to terminals 105 participating in the predefined communication in progress.

Means $116i$, $117i$ $118i$ and $119i$ may be software means situated in each master transmitter.

Each periodic message 115 transmitted by an active master transmitter to the control address comprises information is useful to an operator of the console 101 or 103 and relative to the communication in progress. In particular, the information is: An identifier of the master transmitter, an identifier of the associated channel, the pair of transmission/reception frequencies associated with the channel, and the multicast traffic address on which the IP packets of digitized speech data coming from terminals 105 are transmitted and by which the IP packets of digitized speech data coming from control consoles to terminals 105 are received.

When the site controller 100 becomes operational again and returns to dynamic mode, the master transmitters may notify the control consoles in message 115 of the end of degraded mode. To do this, the method comprises the following steps:

detecting the proper operation of the site controller 100 carried out by detection means $116i$, switching of the master transmitter of the associated channel to dynamic mode carried out by switching means $117i$, and transmitting the control message 115 informing at least one control console 101, 103 connected to the packet network of the end of the degraded mode carried out by the transmission means $118i$.

The invention claimed is:

1. A method for managing a degraded mode of a cell in a cellular telecommunications network, said network comprising a site controller configured to control, via a packet network, a plurality of transmitters distributed on different sites of the cell such that the transmitters implementing the same pair of frequencies over the different sites form a channel, which in dynamic mode is allocated dynamically to any communication between terminals of the cell, said channel comprising a master transmitter selected by the site controller among the transmitters forming the channel, the master transmitter associated with the channel being constructed to synchronize transmission from all of the transmitters of the channel of a message to the terminals present in the cell, the method comprising, in each master transmitter and upon detection of a failure of the site controller that prevents control of the plurality of transmitters by the site controller:

inhibiting the dynamic allocation of transmission channels and switching the master transmitter from the dynamic mode to a degraded mode, enabling a predefined transmission channel known to terminals to be statically associated with a predefined communication known to terminals, and transmitting from the master transmitter to at least one control console positioned outside of the cell, via the packet network, a control message informing the at least one control console connected to the packet network of the implementation of the degraded mode to enable the control console to participate, via said packet network, in a communication in progress in the channel, and to initiate, via said packet network and said channel, a communication with a terminal present in the cell.

2. The method according to claim 1, wherein the control message is periodically transmitted to a multicast control address of the packet network.

3. The method according to claim 1, wherein the control message comprises an indicator of the status of the predefined communication in the associated channel, indicating:

an active status when the predefined communication is established by a terminal over the associated channel, the master transmitter also considered to be in active status, and a passive status when no predefined communication is established by a terminal over the associated channel, the master transmitter also considered to be in passive status.

4. The method according to claim 1, wherein the control message transmitted by the master transmitter comprises at least one of the following pieces of information: an identifier of the master transmitter, an identifier of the associated channel, a predefined pair of frequencies associated with the channel, a multicast traffic address.

5. The method according to claim 4, comprising, in the master transmitter:

transmitting IP packets of digitized speech data coming from a terminal to the multicast address of traffic brought by the control message, and receiving IP packets of digitized speech data via the multicast traffic address, the IP packets coming from a control console such that they are transmitted by the master transmitter to the terminals.

6. The method according to claim 1, in each master transmitter when the site controller is no longer failing:

detecting the proper operation of the site controller, switching the master transmitter of the associated channel to dynamic mode, and transmitting the control message informing at least one control console connected to the packet network of the end of the degraded mode.

7. A communication system comprising a cell in a cellular telecommunications network, said network comprising a site controller configured to control, via a packet network, a plurality of transmitters distributed on different sites of the cell such that the transmitters implementing the same pair of frequencies over the different sites form a channel, which in dynamic mode is allocated dynamically to any communication between terminals of the cell, said channel comprising a master transmitter selected by the site controller among the transmitters forming the channel, the master transmitter associated with the channel being constructed to synchronize transmission from all of the transmitters of the channel of a message to the terminals present in the cell, comprising, in each master transmitter during a failure of the site controller that prevents control of the plurality of transmitters by the site controller:

a detector configured to detect the failure of the site controller so that, upon detection of the failure, the dynamic allocation of transmission channels is inhibited;

a switch configured to switch the master transmitter from the dynamic mode to a degraded mode, enabling a predefined communication known to the terminals to be statically associated with a predefined communication known to terminals, and a transmitter configured to transmit to at least one control console positioned outside of the cell, via the packet network, a control message informing the at least one control console connected to the packet network of the implementation of the degraded mode to enable the control console to participate, via said packet network in a communication in progress in the channel, and to initiate, via said packet network and said channel, a communication with a terminal present in the cell.

8. The communication system according to claim 7, comprising a transmission and reception module in each master transmitter configured to:

transmit IP packets of digitized speech data coming from a terminal to a multicast traffic address to at least one control console and receive IP packets of digitized speech data via the multicast traffic address, the IP packets coming from a control console such that they are transmitted by the master transmitter to the terminals.

9. The communication system according to claim 7, wherein when the site controller is no longer failing, the detector of each master transmitter is configured to detect a proper operation of the site controller, the switch of each master transmitter is configured to switch each master transmitter from degraded mode to dynamic mode, and the transmitter of each master transmitter is configured to transmit the control message informing at least one control console connected to the packet network of the end of the degraded mode.

10. A master transmitter of a communication system comprising a cell in a cellular telecommunications network, said network comprising a site controller configured to control, via a packet network, a plurality of transmitters distributed on different sites of the cell such that the transmitters including the master transmitter, implementing the same pair of frequencies over the different sites form a channel, which in dynamic mode is allocated dynamically to any communication between terminals of the cell, the master transmitter associated with the channel being constructed to synchronize transmission from all of the transmitters of the channel of a message to the terminals present in the cell, the transmitter comprising, during a failure of the site controller that prevents control of the plurality of transmitters by the site controller:
- a detector configured to detect the failure of the site controller so that, upon detection of the failure, the dynamic allocation of transmission channels is inhibited;
- a switch configured to switch the master transmitter from the dynamic mode to a degraded mode, enabling a predefined communication known to the terminals to be statically associated with a predefined communication known to terminals, and
- a transmitter configured to transmit to at least one control console positioned outside of the cell, via the packet network, a control message informing the at least one control console connected to the packet network of the implementation of the degraded mode to enable the control console to participate, via said packet network in a communication in progress in the channel, and to initiate, via said packet network and said channel, a communication with a terminal present in the cell.

11. The master transmitter according to claim 10, comprising a transmission and reception module configured to:
- transmit IP packets of digitized speech data coming from a terminal to a multicast traffic address to at least one control console and
- receive IP packets of digitized speech data via the multicast traffic address, the IP packets coming from a control console such that they are transmitted by the master transmitter to the terminals.

12. The master transmitter according to claim 11, wherein, when the site controller is no longer failing, the detector is configured detect a proper operation of the site controller, the switch is configured to switch the transmitters of the associated channel to dynamic mode, and the transmitter is configured to transmit the control message informing at least one control console connected to the packet network of the end of the degraded mode.

* * * * *

UNITED STATES PATENT AND TRADEMARK OFFICE
CERTIFICATE OF CORRECTION

| | | |
|---|---|---|
| PATENT NO. | : 9,301,168 B2 | Page 1 of 1 |
| APPLICATION NO. | : 13/813992 | |
| DATED | : March 29, 2016 | |
| INVENTOR(S) | : Frédéric Rosin et al. | |

It is certified that error appears in the above-identified patent and that said Letters Patent is hereby corrected as shown below:

On title page, Item (75) Inventors:

Please correct the second inventor's residence to read:

Alain JANSSOONE, Saint Lambert Des Bois (FR)

Signed and Sealed this
Thirty-first Day of May, 2016

Michelle K. Lee
*Director of the United States Patent and Trademark Office*